United States Patent
Liu et al.

(10) Patent No.: US 8,120,288 B2
(45) Date of Patent: Feb. 21, 2012

(54) LIGHT EMITTING DIODE (LED) DRIVING CIRCUIT

(75) Inventors: Chia-Lin Liu, Taichung County (TW);
Ling Li, Hualien County (TW);
Chia-Ling Peng, Taoyuan County (TW);
Kuo-Chung Lo, Tainan (TW);
Chi-Neng Mo, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 422 days.

(21) Appl. No.: 12/542,700

(22) Filed: Aug. 18, 2009

(65) Prior Publication Data

US 2011/0031895 A1 Feb. 10, 2011

(30) Foreign Application Priority Data

Aug. 5, 2009 (TW) .............................. 98126383 A

(51) Int. Cl.
*H05B 37/02* (2006.01)
(52) U.S. Cl. ..................... 315/320; 315/297; 345/102
(58) Field of Classification Search .................. 315/291, 315/294, 297, 307, 308, 312, 313, 320; 345/204, 345/102
See application file for complete search history.

(56) References Cited

U.S. PATENT DOCUMENTS

| | | | |
|---|---|---|---|
| 7,202,608 B2 | 4/2007 | Robinson et al. | |
| 7,233,115 B2 | 6/2007 | Lys | |
| 7,948,468 B2 * | 5/2011 | Zane et al. | 345/102 |
| 2009/0128045 A1* | 5/2009 | Szczeszynski et al. | 315/185 R |
| 2009/0187925 A1* | 7/2009 | Hu et al. | 719/327 |
| 2010/0289424 A1* | 11/2010 | Chang et al. | 315/250 |
| 2010/0295472 A1* | 11/2010 | Wibben et al. | 315/294 |
| 2011/0089859 A1* | 4/2011 | Tseng et al. | 315/294 |

FOREIGN PATENT DOCUMENTS

| | | |
|---|---|---|
| TW | 200417044 | 9/2004 |
| TW | 200614133 | 5/2006 |
| TW | 200710778 | 3/2007 |
| TW | I277024 | 3/2007 |
| TW | M307928 | 3/2007 |
| TW | 200744042 | 12/2007 |
| TW | 200745688 | 12/2007 |
| TW | 200746915 | 12/2007 |
| TW | 200809720 | 2/2008 |

* cited by examiner

*Primary Examiner* — Don Le

(74) *Attorney, Agent, or Firm* — Jianq Chyun IP Office

(57) ABSTRACT

A light emitting diode (LED) driving circuit is provided. The LED driving circuit includes a voltage adjusting unit, a switch unit, and a control unit. The control unit is coupled to the voltage adjusting unit and the switch unit. The voltage adjusting unit outputs a driving voltage to a first end of each of a plurality of load units. The switch unit is coupled to a second end of each of the load units. When one LED string in the load units is coupled to a current source, the voltage adjusting unit adjusts the voltage level of the driving voltage so that the voltage level of the driving voltage of the driving voltage corresponds to the driven LED string. Thereby, a driving problem caused by the variation in electrical characteristics of the LEDs is alleviated.

8 Claims, 2 Drawing Sheets

LIGHT EMITTING DIODE (LED) DRIVING CIRCUIT

CROSS-REFERENCE TO RELATED APPLICATION

This application claims the priority benefit of Taiwan application serial No. 98126383, filed on Aug. 5, 2009. The entirety of the above-mentioned patent application is hereby incorporated by reference herein and made a part of this specification.

BACKGROUND OF THE INVENTION

1. Field of Invention

The present invention relates to Light Emitting Diode (LED) driving circuits. More particularly, the present invention relates to LED backlight driving circuits.

2. Description of Related Art

Electronic devices, such as mobile phones, laptop computers, and personal digital assistants (PDAs), frequently use liquid crystal displays (LCDs) or plasma displays as monitors. However, the LCD or plasma display panels themselves do not generate light. There should be a backlight module mounted to the back of an LCD or plasma panel to provide the light required by the panel. Currently used backlight modules include flat fluorescent lamps (FFLs), cold cathode fluorescent lamps (CCFLs), and light emitting diodes (LEDs). LEDs have become the most promising backlight sources not only because LEDs have small volumes, low heat radiation, low power consumption, long life, and short response time, but also because LEDs have overcome many problem that used to hamper the development of FFL and CCFL backlight modules.

An LED backlight module generally has a plurality of LED strings. Each of the LED strings is made up of one or a plurality of serially connected LEDs. A driving voltage with a constant voltage level is used to drive all the LED strings. In order to adjust the light luminance of each LEDs, the pulse width modulation (PWM) technique is used to adjust the duty cycle of the driving voltage. However, the inevitable variation in raw material and manufacturing process will cause the LED strings in a backlight module to have different conducting (i.e. turning-on) voltages. Because a driving voltage with a constant voltage level is used to drive the red-light LEDs, the green-light LEDs, and the blue-light LEDs, the three lights will have incoherent light luminance. The incoherent light luminance of the three lights will deteriorate the light quality of the resulting white light. One solution to the above problem is to utilize a constant driving voltage with a higher voltage level to drive all the LED strings. However, the solution will waste more power and curtail the life of the over-driven LEDs.

SUMMARY OF THE INVENTION

Accordingly, the present invention is directed to provide an LED driving circuit that adjusts the voltage level of a driving voltage according to the variation in electrical characteristics among the driven LEDs or LED strings. The LED driving circuit can drive LEDs with different conducting voltage levels, achieve better white light quality, and reduce power consumption.

The present invention provides an LED driving circuit for driving a plurality of load units. Each of the load units includes at least an LED. The LED driving circuit includes a voltage adjusting unit, a switch unit, and a control unit. The voltage adjusting unit outputs a driving voltage to a first end of each of the load units. The switch unit is coupled between a current source and a second end of each of the load units. The switch unit selectively couples one of the load units to the current source. The control unit is coupled to the voltage adjusting unit and the switch unit. The voltage adjusting unit adjusts the driving voltage according to a first control signal generated by the control unit. The switch unit selectively couples the one of the load units to the current source according to a second control signal generated by the control unit.

When the switch unit couples a first load unit of the load units to the current source, the voltage adjusting unit adjusts a voltage level of the driving voltage so that the voltage level of the driving voltage corresponds to the first load unit.

According to an embodiment of the present invention, when the switch unit couples a second load unit of the load units to the current source, the voltage adjusting unit adjusts the voltage level of the driving voltage so that the voltage level of the driving voltage corresponds to the second load unit.

According to an embodiment of the present invention, when the switch unit sequentially couples a series of load units of the load units to the current source, the voltage adjusting unit adjusts the voltage level of the driving voltage so that the voltage level of the driving voltage sequentially corresponds to the series of load units of the load units.

According to an embodiment of the present invention, the switch unit includes a plurality of switches and a switch control unit. Each of the switches is coupled between the current source and one of the load units. The switch control unit is coupled to the switches, and selectively turns on one of the switches according to the second control signal.

According to an embodiment of the present invention, the switches include N-type transistors or P-type transistors.

According to an embodiment of the present invention, the voltage adjusting unit includes a boost circuit or a buck circuit.

According to an embodiment of the present invention, the load units at least include an LED string. The LED string includes a plurality of serially connected first LEDs.

According to an embodiment of the present invention, the current source is a constant current source.

The present invention utilizes a driving voltage with an adjustable voltage level to drive the LEDs or LED strings of a backlight module. Because the driving voltage is adjusted according to the variation in electrical characteristics of the LEDs or LED strings, the present invention not only alleviates the driving problem caused by the variation in the electrical characteristics, but also reduces the power consumption. In addition, when the present invention is adopted to drive LEDs with multiple colors, such as red, green, and blue, the light luminance of the LEDs will be more coherent and the resulting white light will have a better quality.

In order to the make the aforementioned and other objects, features and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings

DESCRIPTION OF EMBODIMENTS

Figure 1:
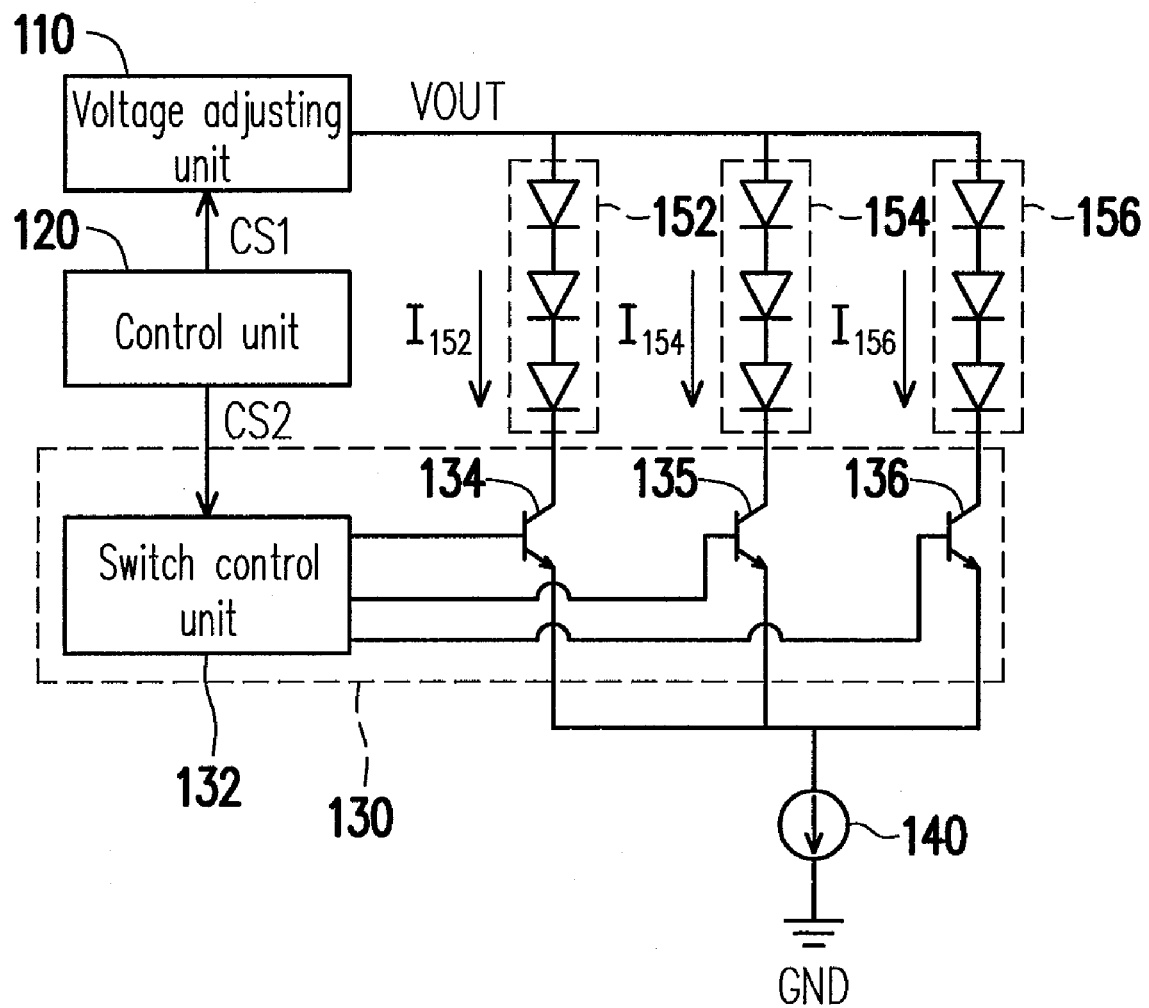
FIG. 1 is a circuit diagram of a driving circuit according to an embodiment of the present invention.

FIG. 1 is a circuit diagram of a driving circuit according to an embodiment of the present invention. FIG. 1 shows not only the driving circuit but also load units 152, 154, and 156. The driving circuit includes a voltage adjusting unit 110, a control unit 120, a switch unit 130, and a current source 140. The switch unit 130 includes a switch control unit 132 and switches 134, 135, and 136. The switches 134, 135, and 136 can be embodied by transistors, such as NPN or PNP bipolar junction transistors (BJTs), or N channel metal oxide semiconductor transistors (NMOSs), or P channel metal oxide semiconductor transistors (PMOSs). The load units 152, 154, and 156 can be LED strings in a backlight module.

The control unit 120 is coupled to the voltage adjusting unit 110 and the switch control unit 132. The control unit 120 outputs a first control signal CS1 to the voltage adjusting unit 110 and outputs a second control signal CS2 to the switch control unit 132. The voltage adjusting unit 110 adjusts the voltage level of a driving voltage VOUT according to the first control signal CS1 and outputs the driving voltage VOUT to a first end of each of the load units 152, 154, and 156. If the load units 152, 154, and 156 are LED strings, the first ends of the load units 152, 154, and 156 can be the anodes of the LED strings. The switch control unit 132 is coupled to the switches 134, 135, and 136. The switch control unit 132 selectively turns on the switch 134, 135, or 136 according to the second control signal CS2. The current source 140 is coupled between the ground GND and a second end of each of the switches 134, 135, and 136. The voltage adjusting unit 110 can include, for example, a boost circuit or a buck circuit.

When the switch control unit 132 turns on the switch 134, the voltage adjusting unit 110 adjusts the voltage level of the driving voltage VOUT so that the voltage level of the driving voltage VOUT corresponds to the load unit 152. When the switch control unit 132 turns on the switch 135, the voltage adjusting unit 110 adjusts the voltage level of the driving voltage VOUT so that the voltage level of the driving voltage VOUT corresponds to the load unit 154. Similarly, when the switch control unit 132 turns on the switch 136, the voltage adjusting unit 110 adjusts the voltage level of the driving voltage VOUT so that the voltage level of the driving voltage VOUT corresponds to the load unit 156. When one of the load units 152, 154, and 156 receives the driving voltage VOUT that is high enough to conduct (i.e. turn on) the interior LED string of the load unit, a current will pass through the interior LED string and the interior LED string will generate corresponding light luminance.

Variation in the raw material and manufacturing process may cause the load units 152, 154, and 156 to have different conducting voltages. The conducting voltage of a load unit is the voltage required to conduct (i.e. turn on) the interior LED string of the load unit. The driving circuit of this embodiment can be preset with the different conducting voltages of the load units 152, 154, and 156. Through properly controlling and synchronizing the switch control unit 132 and the voltage adjusting unit 110, the driving circuit of this embodiment can turn on one or more of the load units 152, 154, and 156 in correct timing and with appropriate driving voltage VOUT.

The control unit 120 is mainly used to control the voltage level of the driving voltage VOUT and the conducting timing of the switches 134~136 so that the voltage level of the driving voltage VOUT can be adjusted according to one of the load units 152~154 conducted to current source 140. In other words, the control unit 120 controls the work timing of the voltage adjusting unit 110 and the switch control unit 132. Specifically, the control unit 120 controls the timing of turning-on/turning-off the switches 134~136 and the timing of changing the voltage level of the driving voltage VOUT. The result is that when one of the switches 134~136 is on (i.e. conducting), the voltage level of the driving voltage VOUT will correspond to the load unit connected to the conducting switch to light the LED strings of the load units 152~156.

Figure 2:
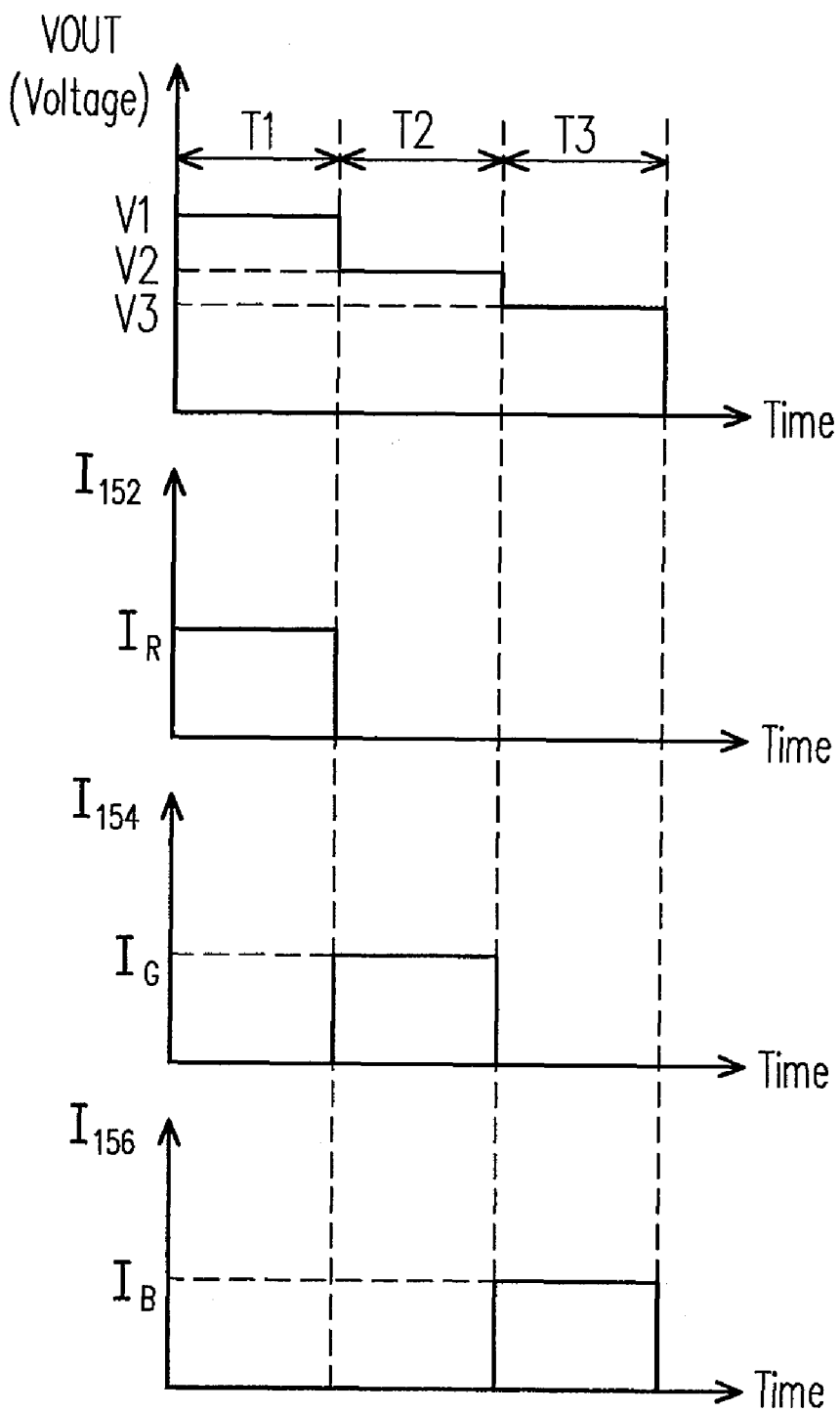
FIG. 2 is an exemplary diagram showing the relationship between the driving voltage and the currents of the load units according to an embodiment of the present invention.

FIG. 2 is an exemplary diagram showing the relationship between the driving voltage VOUT and the currents $I_{152}, I_{154}$, and $I_{156}$ flowing through the load units 152, 154, and 156 according to an embodiment of the present invention. In this embodiment, the switch control unit 132 turns on the switches 134, 135, and 136 during the time periods T1, T2, and T3, respectively. The voltage level of the driving voltage VOUT is adjusted according to the conducting timing of the switches 134, 135, and 136. Therefore, the voltage level of the driving voltage VOUT during the time periods T1, T2, and T3 is equal to voltage levels V1, V2, and V3, respectively. When the switches 134, 135, and 136 are turned on in order, the conducting currents $I_{152}, I_{154}$, and $I_{156}$ flowing through the corresponding load units 152, 154, and 156 are generated in order.

As is shown in FIG. 2, during the time period T1, the load unit 152 receives the driving voltage VOUT and the conducting current $I_{152}$ that are equal to V1 and $I_R$, respectively. During the time period T2, the load unit 154 receives the driving voltage VOUT and the conducting current $I_{154}$ that are equal to V2 and $I_G$, respectively. During the time period T3, the load unit 156 receives the driving voltage VOUT and the conducting current $I_{156}$ that are equal to V1 and $I_B$, respectively. The light luminance generated by the load units 152, 154, and 156 are determined by the levels of the conducting currents $I_{152}, I_{154}$, and $I_{156}$, respectively. When one of the conducting currents $I_{152}, I_{154}$, and $I_{156}$ is zero, the LED string receiving the zero conducting current will be off, i.e. not conducting. Because the current values $I_R, I_G, I_B$ of the conducting currents are determined by the current source 140 and the current source 140 of this embodiment is a constant current source, the currents $I_R, I_G, I_B$ are substantially the same.

Assume that the load units 152, 154, and 156 are the red-light, green-light, and blue-light LEDs of a backlight module, respectively. If a constant driving voltage VOUT is used to drive the load units 152, 154, and 156, the load units 152, 154, and 156 may generate different light luminance and have different turn-on timing. The resulting white light of the backlight module will have an inferior quality. By utilizing an adjustable driving voltage VOUT to drive the LEDs, the embodiment not only alleviates the backlight control problem caused by the variation in the LEDs but also reduces the power wastage caused by using a higher driving voltage.

Please note that the number of the load units in FIG. 1 is not limited to three. Each of the load units can have a plurality of LED strings. Each of the LED strings can include one or more than one LED. The voltage levels of the driving voltage VOUT are not limited to V1, V2, and V3. At any given time point, the voltage adjusting unit 110 and switch control unit 132 can drive one or more than one load unit by providing the driving voltage with a voltage level corresponding to the currently driven load unit(s). Persons having ordinary skills in the art will be able to contrive other modifications of the aforementioned embodiments. Those modifications should also be cover and protected by the claims of the present invention.

As mentioned, the embodiment of the present invention utilizes an adjustable driving voltage to drive LED strings. The driving voltage is adjusted according to the electrical characteristics of the currently driven LED string(s). Therefore, the embodiment alleviates the LED driving problem caused by different conducting voltages of different LEDs.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A light emitting diode (LED) driving circuit, for driving a plurality of load units, each of the load units including at least an LED, the LED driving circuit comprises:
    a voltage adjusting unit, for outputting a driving voltage to a first end of each of the load units;
    a switch unit, coupled between a current source and a second end of each of the load units, the switch unit selectively coupling one of the load units to the current source; and
    a control unit, coupled to the voltage adjusting unit and the switch unit, the voltage adjusting unit adjusting the driving voltage according to a first control signal generated by the control unit, the switch unit selectively coupling the one of the load units to the current source according to a second control signal generated by the control unit;
    wherein when the switch unit couples a first load unit of the load units to the current source, the voltage adjusting unit adjusts a voltage level of the driving voltage so that the voltage level of the driving voltage corresponds to the first load unit.

2. The LED driving circuit of claim 1, wherein when the switch unit couples a second load unit of the load units to the current source, the voltage adjusting unit adjusts the voltage level of the driving voltage so that the voltage level of the driving voltage corresponds to the second load unit.

3. The LED driving circuit of claim 1, wherein when the switch unit sequentially couples a series of load units to the current source, the voltage adjusting unit adjusts the voltage level of the driving voltage so that the voltage level of the driving voltage sequentially corresponds to the series of load units or one of the coupled load units.

4. The LED driving circuit of claim 1, wherein the switch unit comprises:
    a plurality of switches, coupled between the current source and the load units, respectively; and
    a switch control unit, coupled to the switches, for selectively turning on the switches according to the second control signal.

5. The LED driving circuit of claim 4, wherein the switches comprise N-type transistors or P-type transistors.

6. The LED driving circuit of claim 1, wherein the voltage adjusting unit comprises a boost circuit or a buck circuit.

7. The LED driving circuit of claim 1, wherein the load units at least comprise an LED string, the LED string comprises a plurality of serially connected first LEDs.

8. The LED driving circuit of claim 1, wherein the current source is a constant current source.

* * * * *